United States Patent [19]

Bree

[11] Patent Number: 4,767,647
[45] Date of Patent: Aug. 30, 1988

[54] DECORATIVE EMBLEM

[75] Inventor: Charles E. Bree, Delaware, Ohio

[73] Assignee: The D. L. Auld Company, Columbus, Ohio

[21] Appl. No.: 580,326

[22] Filed: Feb. 15, 1984

Related U.S. Application Data

[62] Division of Ser. No. 103,963, Dec. 17, 1979, Pat. No. 4,481,160.

[51] Int. Cl.$^4$ ............................................. A47G 35/00
[52] U.S. Cl. ...................................... 428/14; 428/13; 428/67; 428/187; 428/542.2; 428/913.3; 40/1.5
[58] Field of Search ....................... 428/13, 14, 67, 187, 428/542.2, 913.3; 40/1.5, 10 D, 324; 156/242; 264/74, 132, 271.1; 63/20, DIG. 3

[56] References Cited

U.S. PATENT DOCUMENTS

| | | | |
|---|---|---|---|
| 1,953,784 | 3/1934 | Strassner et al. | 264/247 |
| 2,425,933 | 8/1947 | Gregory | 428/67 |
| 2,451,913 | 10/1948 | Brice | 428/67 |
| 2,931,119 | 4/1960 | Gits et al. | 264/132 |
| 3,197,531 | 7/1965 | Wilbur, Jr. | 425/447 |
| 3,312,197 | 4/1967 | Smith | 264/271 |
| 3,344,011 | 9/1967 | Groozner | 156/242 X |
| 3,363,039 | 1/1968 | Nagai et al. | 264/255 |
| 3,451,879 | 6/1969 | Fuller | 156/242 X |
| 3,456,043 | 7/1969 | Emery | 264/255 |
| 3,518,146 | 6/1970 | Plympton | 264/247 |
| 3,530,022 | 9/1970 | Mallory | 264/255 |
| 3,660,211 | 5/1972 | Brody | 264/293 |
| 3,695,982 | 7/1970 | Brody | 428/67 X |
| 3,833,693 | 9/1974 | Ross | 425/447 |
| 3,843,475 | 10/1974 | Kent | 428/13 |
| 3,896,199 | 7/1975 | Michaelis | 264/271.1 X |
| 3,962,505 | 6/1976 | Avery | 428/65 |
| 4,067,947 | 1/1978 | Miori | 264/255 |
| 4,100,010 | 7/1978 | Waugh | 264/132 |
| 4,115,506 | 9/1978 | Shima | 264/255 |
| 4,209,486 | 6/1980 | Ross | 264/255 |
| 4,307,527 | 12/1981 | Suzuki | 428/13 X |

FOREIGN PATENT DOCUMENTS

| | | | |
|---|---|---|---|
| 0012581 | 7/1979 | European Pat. Off. | 264/246 |
| 0005376 | 8/1979 | European Pat. Off. | 264/246 |
| 2731081 | 7/1977 | Fed. Rep. of Germany | 264/246 |
| 1448584 | 9/1965 | France | 264/246 |
| 0467896 | 6/1937 | United Kingdom | 264/274 |

*Primary Examiner*—Joseph L. Schofer
*Assistant Examiner*—F. M. Teskin
*Attorney, Agent, or Firm*—Killworth, Gottman Hagan & Schaeff

[57] ABSTRACT

A decorative emblem is formed by insertion of a decorative foil shape into a preformed bezel and encapsulating and bonding the foil to the bezel with a fluent, curable plastic material. After an initial casting of a measured amount of plastic onto the base of the bezel, the foil is inserted and seated. A second cast of plastic forms a cap contiguous with the sides of the bezel and encapsulates the foil and bonds it within the bezel. Upon curing, the plastic cap gives a lens effect to the decorative emblem. The emblem may be equipped with attachment means for fastening it to an automobile, appliance, or other object. In alternative embodiments, a decorative foil shape is placed directly onto the base of the bezel, and a fluent, curable plastic material is cast thereon. As the plastic material cures, it migrates around the edges and under the foil to at least partially encapsulate the foil and bond it within the bezel. In some instances, channels may be cut or molded into the base of the bezel to aid the flow of fluent, curable plastic material beneath the decorative insert.

5 Claims, 3 Drawing Sheets

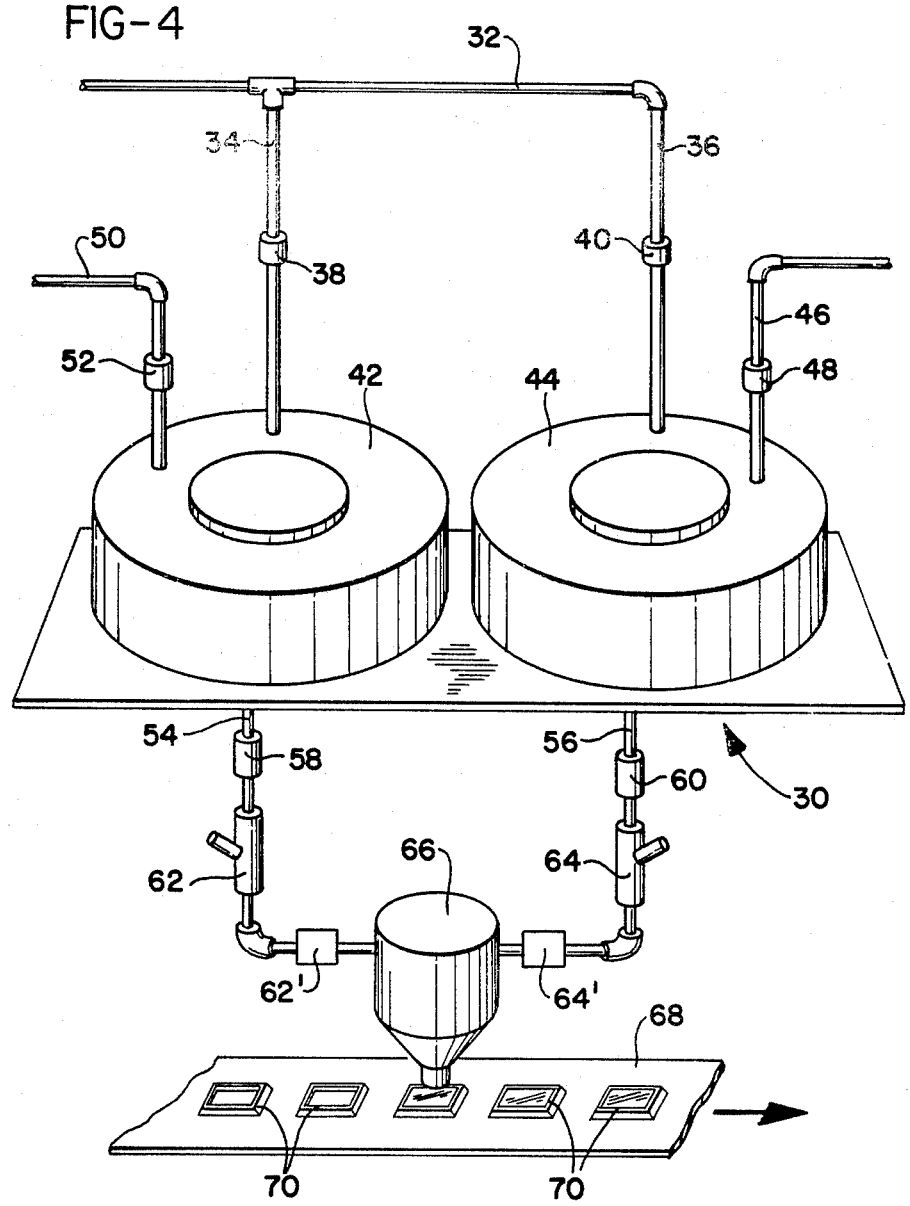

DECORATIVE EMBLEM

This is a division of application Ser. No. 103,963 filed Dec. 17, 1979, U.S. Pat. No. 4,481,160.

BACKGROUND OF THE INVENTION

This invention relates to decorative plaques and emblems and methods of making them, and more particularly to a decorative emblem or plaque having a decorative surface encapsulated in a cured plastic resin integral with a bezel and a method for making the same.

Decorative plaques and emblems are widely used throughout a number of industries including the automotive and appliance industries. In the past, such plaques and emblems were formed by flowing a colored vitreous frit into a bronze substrate and firing it at 1250° F. The glass-like vitreous enamel served to beautify the product and protect the decorative emblem from weathering. Today, plastics are primarily used for making such plaques and emblems. For example, the assignee of the present invention has been producing emblems since 1966 which have a molded or cast body into which plastic is deposited. A description of such products can be found in the July-August, 1972, issue of duPont Magazine, pp. 29–31.

Likewise, Loew, U.S. Pat. No. 3,654,062, discloses a process for injection molding a decorative Mylar facing sheet over a vinyl plastic body. The plaque is coated with a layer of protective varnish on the outer surface of the facing sheet. Gits, U.S. Pat. No. 3,246,066, is similar in that male and female molds are used to form a cavity into which a decorative foil is placed and into which a clear plastic material is injected. Prior to injecting a clear plastic material against the front face of the foil, the foil is precoated. Other molding processes such as compression molding are also known in the art. See for example U.S. Pat. Nos. 2,244,565; 2,931,119; 3,075,249; and 3,114,597.

Also known generally is the concept of encapsulating an article in plastic by casting, partially curing, inserting the article, casting again, and completing the cure. For example, in Brody, U.S. Pat. No. 3,660,211, the article is a metal foil of a multicolored iridescent body embedded between two layers of a polyester resin; in Smith, U.S. Pat. No. 3,312,197, the article is a facsimile of a coin embedded between a transparent and an opaque, colored plastic resin material; and in Miori, U.S. Pat. No. 4,067,947, the article is embedded between two different layers of plastic resin material.

In Waugh, U.S. Pat. No. 4,100,010, assigned to the assignee of this invention, there is disclosed an improved process of producing decorative emblems. That process involves casting a plastic material onto decorative foil shapes to form a meniscus which when cured gives a lens effect to the top surface of the foil. A problem with that process is that the then capped substrate will be used as an insert to be placed inside a decorative bezel, which is typically a highly polished die casting, plastic, metallized plastic, or some other decorative material. See also U.S. Pat. Nos. 4,087,570 and 4,139,654.

Therefore, in order to produce a complete emblem, it is necessary to decorate the foil substrate, emboss the decorated substrate, apply a pressure-sensitive adhesive to the back of the substrate, cast the plastic material onto the top surface of the substrate, cure the plastic, and then insert the capped decorated substrate into a separately manufactured bezel. As can be seen, such a process involves a large number of process steps, many of which require skilled craftsman and accompanying high labor costs.

Attempts have also been made to manufacture decorative plaques and emblems by applying a pressure-sensitive adhesive to the back of a decorated foil substrate and inserting it into a bezel. Plastic is then cast into the recess in the bezel, completely covering the substrate. However, the above method suffers from the problem of gas bubble formation in the plastic during curing caused by the release of gas bubbles from volatile solvents present in the adhesive layer between the foil substrate and the base of the bezel during curing. The gas bubbles adversely affect the clarity and quality of the plastic layer overlying the substrate.

As can be seen, the need still exists in this art for a more efficient, reliable, and simple method of forming a decorative plaque or emblem.

SUMMARY OF THE INVENTION

In accordance with the present invention, a decorative emblem or plaque is provided in which an embossed or otherwise decorated substrate is encapsulated in a plastic material and bonded to a preformed bezel. The plaque or emblem is produced by first dispensing from a unique nozzle design a small amount of a curable liquid plastic material into the base of the preformed bezel. The curable plastic material is preferably a fluent polyurethane of two component parts (a polyol and an isocyanate) which are mixed immediately prior to casting and cure upon heating. A polyurethane of this type is disclosed in the above-mentioned Waugh U.S. Pat. No. 4,100,010.

For most of the types of plastic contemplated for use in this invention, curing will be by infrared radiation or other known means. The polyurethane compositions mentioned above are heat curable and, therefore, infrared lamps may be used although obviously other suitable sources of heat will accomplish curing.

The bezel base is prepared to receive this initial portion of plastic material by coating it with a primer which acts to increase the adherence of the plastic to the bezel. Silane primers have been found to be suitable for this purpose. Additionally, the bezel is preferably preheated to drive off any surface moisture and increase the flowability of the plastic material.

The fluent plastic material is applied to the base of the bezel in an amount sufficient to cover the base and, when the decorated or embossed insert is placed in the bezel, should wet up the side of the insert and form a small bead of material around the periphery of the insert. After the plastic material is flowed into the bezel, a decorative insert is pressed into position in the bezel. Preferably, this insert is preheated to drive off any surface moisture and to aid in the flow of plastic material. The insert can take the form of a decorative metal foil which can be embossed to enhance the decorative design thereon. Alternatively, the insert may be a laminated metal foil or metallized plastic foil. Preferably, the decorative design on the foil is applied by silk-screening or lithographic printing techniques.

The entire bezel is then preheated in preparation for application of more fluent plastic material. A precisely metered amount of fluent plastic is then cast from a unique nozzle arrangement onto and over the decorative insert in the bezel to form a cap, the outer edges of which form a meniscus which is contiguous with the peripheral edge of the bezel. The bezel is then placed in a heated oven to cure and harden the plastic. In an alternate embodiment, the initial layer of plastic material applied to the base of the bezel may be partially or completely cured after placement of the insert but before the casting of the second portion of plastic material. In both of these embodiments, a decorative plaque or emblem is produced which is simple to manufacture and results in a reliable bond between bezel, insert, and plastic.

In another alternative embodiment, the bezel base is prepared as before by coating it with a primer and preheating it to drive off any surface moisture. A decorated and embossed insert is then placed in the bezel base, and a precisely metered amount of a fluent, plastic material is flowed into the bezel and over the embossed insert to form a cap which is contiguous with the peripheral edge of the bezel. As the fluent, plastic material is flowed into the bezel, it will migrate around the edges of the embossed insert to the underside of the insert. The insert will be raised slightly off the surface of the base of the bezel, permitting the plastic material to at least partially encapsulate the insert and bond it to the bezel. The bezel is then placed in a heated oven to cure and harden the plastic.

In yet another alternative embodiment, for instances in which the decorative insert is not embossed, one or more channels may be formed in the base of the bezel. After the application of a primer to the base of the bezel, the bezel is preheated, and the decorative insert is placed into the base. A precisely metered amount of a fluent, plastic material is then flowed into the bezel and over the decorated insert, filling the channels beneath the insert and forming a cap contiguous with the peripheral edge of the bezel. The bezel is then placed in a heated oven to cure and harden the plastic.

Accordingly, it is an object of this invention to provide decorative emblems which have decorative inserts permanently bonded to a bezel by an encapsulating plastic material and a method of making them; it is another object of this invention to provide an efficient and reliable method of preparing a decorative insert cast in place in a bezel. These and other objects and advantages of the invention will become apparent from the following description, the accompanying drawings, and the appended claims.

BRIEF DESCRIPTION OF THE DRAWINGS

FIG. 4 is a perspective view of the casting system for depositing the fluent plastic material into the bezel.

DESCRIPTION OF THE PREFERRED EMBODIMENTS

Figure 1:
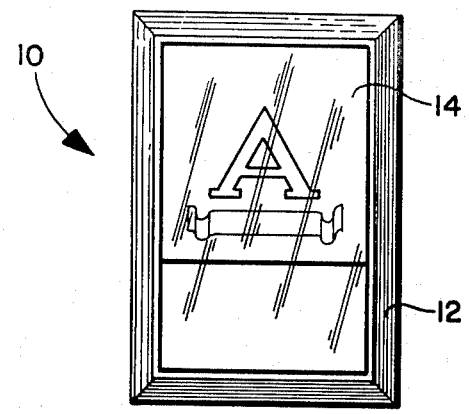
FIG. 1 is a front view of the emblem of the present invention with an encapsulated decorative insert bonded to a bezel.

Referring to FIG. 1, there is illustrated an emblem 10 of the present invention. An emblem of the type shown may be considered by some to be a plaque or nameplate rather than an emblem, but for the purposes of this invention, no distinction will be made. It should be apparent to those skilled in this art that either emblems, plaques, nameplates, or the like may be made in the same manner as disclosed herein. Accordingly, the term emblem will be used to encompass all such items.

Emblem 10 has a bezel 12 with peripheral upstanding sidewalls which surround a centrally located decorative surface 14. Bezel 12 may be formed of a plastic such as an acrylonitrile-butadiene-styrene resin, metallized or chrome-plated plastic, or a metal or metal alloy such as aluminum or zinc. To the back of bezel 12 may be attached welded or extruded studs, tabs, or adhesive tape which are used to attach the completed emblem to the intended object.

Bezel 12 is prepared to receive a first measured amount of fluent plastic material by preheating it to drive off any surface moisture which could interfere with good bonding or cause bubbles to appear in the plastic during curing. The preheating also aids in improving the flow of plastic material.

Additionally, the surface of the bezel may be sprayed or coated with a primer, such as a known silane primer to improve the bond formed between the surface of the bezel and the plastic material. As an example, a mixture of approximately 6% polyvinyl butyrate (Butvar B-90 from the Monsanto Chemical Co.), approximately 3.4% silane (Dow 6020, 6040, or 6075 from Dow Corning Corp., which are respectively, 3-(2-amino-ethylamine) propyltrimethoxysilane, glycidoxypropyl-trimethoxysilane, and vinyl-triacetooxysilane), approximately 1% of an epoxy resin (Araldite 6005 from the Ciba-Geigy Corp.), approximately 3.4% of an aqueous solution of chromic and phosphoric acids, and approximately 0.01% of a colorant (Tinopal SFG from Geigy Chemical Co.) in a solvent (such as 36% n-butanol or isobutanol and 64% acetone) may be used.

Figure 2:
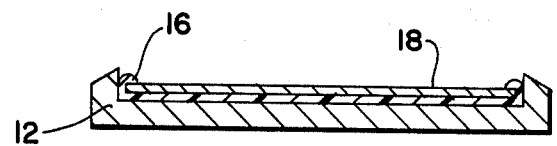
FIG. 2 is a cross-sectional view of a partially completed emblem illustrating the placement of a decorative insert over the initial layer of plastic in the bezel.

After preheating, the bezel is taken to a first casting station where an amount of fluent plastic material 16 is cast onto the base of the bezel. The amount should be sufficient to cover the entire base surface of the bezel, wet the sides of an inserted decorative foil shape, and form a bead of material about its upper periphery as shown in FIG. 2. This amount will vary according to the size and shape of the bezel and foil insert.

The decorative foil shape 18 may be made of metal, paper, or plastic. Preferably, the foil shape is prepared from an aluminum or aluminum alloy sheet which is brushed, printed by either a silk screen or lithographic printing process, and then cut to size. Multiple colors may be printed using well known techniques. Optionally, the decorative foil may be embossed by specially etched embossing dies to yield a three-dimensional appearance to the foil. In a preferred embodiment, the height of the embossment is in the range of 0.010 inches, yielding an overall height of 0.010 inches plus material thickness.

Decorative foil shape 18 is preheated to drive off any surface moisture and then inserted into bezel 12. Slight pressure is applied (approximately 5 psi) to seat the foil shape and cause the still fluent plastic material to flow up the sides of foil shape 18 forming a bead of material around the upper edges thereof as shown in FIG. 2 in which at least a portion of the upper surface of foil shape 18 is left uncovered by the fluent plastic material.

Figure 3:
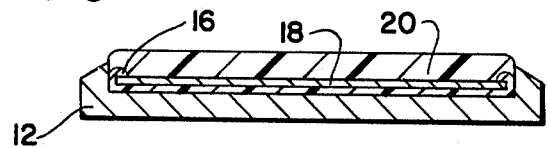
FIG. 3 is a cross-sectional view of the emblem of the present invention illustrating the lens cap effect of second casting of plastic material.

The partially formed emblem is then reheated in preparation for a second casting of fluent plastic material. Infrared heating lamps have been found to be suitable for this purpose. A second measured amount of fluent plastic material 20 is then dispensed onto the bezel and foil shape as shown in FIG. 3 forming a lens cap over the foil shape and completely encapsulating it in plastic. As shown in FIG. 3, the lens cap takes the form of an upper surface, the outer edges of which form a meniscus which is contiguous with the peripheral upstanding sidewalls of bezel 12. The plastic material is then cured, preferably by heat and infrared radiation.

Alternatively, the partially formed emblem may be cured immediately after the decorative foil shape has been positioned over the plastic. Then the second cast may be performed in the manner discussed above and the emblem cured again.

Figure 2A:
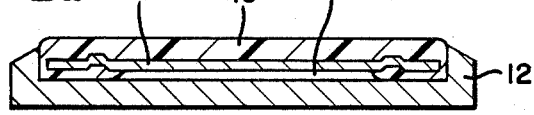
FIG. 2a is a cross-sectional view of an emblem produced by an alternative embodiment of the process of the present invention.

In the alternative embodiment of the invention illustrated in FIG. 2a, bezel 12 is prepared as before. An embossed decorative foil shape 18 is then inserted into bezel 12 and a precisely metered amount of fluent plastic material 16 is dispensed onto the bezel and foil shape forming a cap contiguous with the peripheral edge of the bezel as illustrated. Because the plastic material is fluent, it will migrate around the edges of foil shape 18 and underneath it, raising it slightly off the base of bezel 12 and bonding it in place.

It has been found that allowance of a clearance of as little as 0.01" to 0.02" between the edges of the foil shape and the bezel walls permits the fluent plastic to flow around and beneath the shape. The embossments on the shape aid in permitting the fluent plastic to flow beneath the shape. In many cases, the plastic will penetrate as far as 0.5" in from the edges of the shape, bonding it in place in bezel 12. A small air pocket 22 will be formed beneath shape 18, but it has been found to present no problems during curing of the plastic to form the finished emblem. In order to allow time for the fluent plastic material to flow beneath the decorative shape, longer cure times using lower curing temperatures are preferred.

Figure 3A:
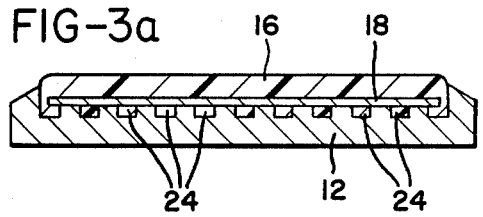
FIGS. 3a and 3b are cross-sectional and top views, respectively, of an emblem produced by an alternative embodiment of the process of the present invention, with FIG. 3a being taken along line 3a—3a of FIG. 3b.
Figure 3B:
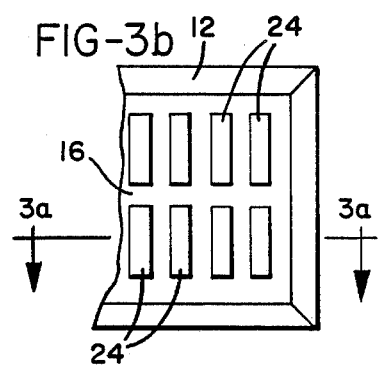

In yet another alternative embodiment illustrated in FIGS. 3a and 3b, shallow channels 24 are formed in the base of bezel 12 to aid the flow of fluent plastic material beneath decorated foil shape 18. These channels may be about 0.025" deep and about 0.125" wide although the exact dimensions are not critical. The channels may be formed in the base of bezel 12 by any conventional means such as, for example, molding them during a bezel forming operation or sawing grooves in a completed bezel.

The bezel 12 is prepared as before and may be coated with a primer to improve the bonding of the plastic to the bezel. A decorated foil shape 18 is then inserted into bezel 12 and rests on the lands between channels 24. A precisely metered amount of fluent plastic material is then dispensed onto the bezel and foil shape forming a cap contiguous with the peripheral edge of the bezel as illustrated.

The fluent plastic material flows around the edges of the decorative shape and into channels 24. This embodiment is particularly useful when the decorative foil shape 18 is flat and has no embossments. The emblem is then cured as before, and preferably using longer curing times at lower temperatures, to form a tough bonded article which is suitable for both interior and exterior uses.

Figure 5:
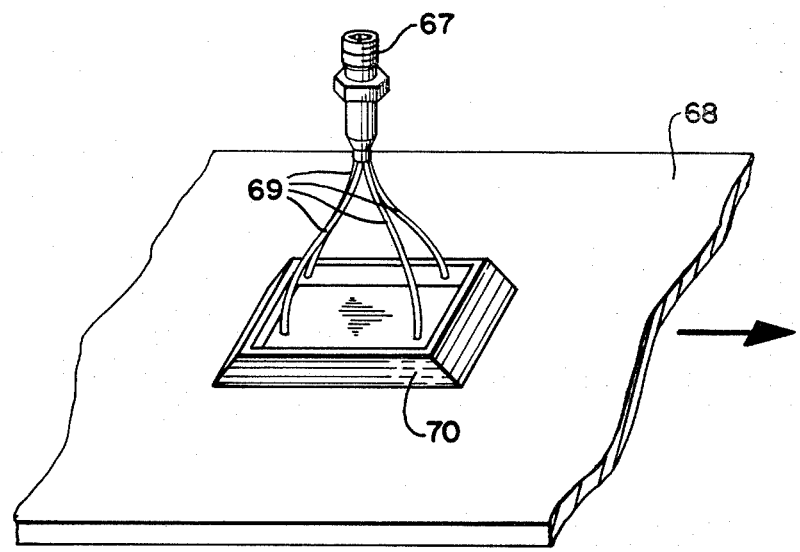
FIG. 5 is a perspective view of a multiple nozzle arrangement used in the casting of the plastic material.

The preferred system for casting the fluent plastic material is shown in FIGS. 4 and 5. In the practice of the present invention, two separate casting apparatuses are used, one for the initial cast and one for the final capping and encapsulating cast. The casting apparatus is designated generally 30. An air supply line 32 is connected via lines 34 and 36 to storage-degassing tanks 42 and 44, respectively. The pressure in line 32 can be controlled to be positive, negative, or atmospheric. A pair of ball valves 38 and 40 are inserted in lines 34 and 36 to insure that tanks 42 and 44 remain at a desired air pressure after source pressure is removed in line 32. Supply lines 50 and 46, having ball valves 52 and 48 therein, supply component Part A and Part B to tanks 42 and 44, respectively. Parts A and B are preferably portions of a two-component polyurethane plastic.

This may be a mixture of "A" and "B" components of the type disclosed in U.S. Pat. No. 4,100,010. Basically, that mixture is one of a polyether polyol component ("A"), which may be a difunctional, trifunctional and/or tetrafunctional polypropylene glycol containing a suitable catalyst, and a diisocyanate component ("B") such as an aliphatic diisocyanate. A catalyst such as a lead material is used since it promotes a slow cure at room temperature so as to allow time for full flow of the liquid polyurethane before setting. As stated in U.S. Pat. No. 4,100,010, which is specifically incorporated herein by reference, an example of the diisocyanate is Hylene W from E. I. duPont de Nemours and Co., and the polyether polyol may be one or more of the Pluracol materials (P-410 or TP-440) from BASF Wyandotte. It may also be a polyether-polyester polyol combination, use of the polyester polyol making the cured polyurethane more flexible. The ratio of components A:B is preferably 50-60: 40-50. A polyester polyol or polylactone polyol could be used in place of the polyether polyol.

The mixture of "A" and "B" components of this type cures, through catalytic action, under heat such as produced by infrared radiation. Accordingly, this type of arrangement will be disclosed as the preferred embodiment although single component, block catalyst systems liberated by other known means could also be used.

The "A" and "B" materials can be stirred in tanks 42 and 44 of FIG. 4 for the purpose of degassing. The degassed material then flows down pipes 54, 56 through ball valves 58, 60 through filters 62, 64 through metering devices 62' and 64' and into mixing and casting head 66 which is of a standard design.

Located beneath the casting head is a moving conveyer 68 with which the casting head 66 is timed. The conveyer carries the bezels, indicated as 70, which are to be filled. When a bezel comes under the casting head, the belt stops. A predetermined amount of the plastic material is cast and then the conveyer moves the next bezel into position.

As shown in FIG. 5, in a preferred embodiment, casting head 66 has a nozzle means 67 which has a plurality of applicator tubes 69. A nozzle means having a specific fixed applicator tube may be used for a given bezel configuration. When casting into a different bezel configuration, a different nozzle means is attached to casting head 66. Alternatively, and preferably, the applicator tubes 69 of nozzle means 67 are movable and may be adjusted to the desired arrangement depending on the bezel shape used. Optionally, with multiple nozzle means, the two casting operations can be performed on a continuously moving conveyor belt. The nozzle means of the present invention, with its plurality of applicator tubes, permits the rapid and even dispensing of fluent plastic material onto the bezel with the least possible entrapment of air. The only significant structural difference in casting head 66 and nozzle means 67 between the first and second casting stations is that the casting head at the first station has a reduced volume because of the relatively small amount of material dispensed per bezel and to prevent the premature curing of the plastic once the two components have been mixed together.

After the final casting operation, the cast emblems are moved forward into baking areas containing infrared lamps. The emblems are then cooled and unloaded.

In this way, there is produced a decorative emblem which has all of the features of the emblems of the past, but is easier to produce because of the encapsulation and bonding of the foil to the bezel by the plastic material. As a result, a number of otherwise costly manufacturing steps can be eliminated. This provides significant advantages in an industry such as the one described.

While the article and method herein described constitute preferred embodiments of the invention, it is to be understood that the invention is not limited to this precise article and method, and that changes may be made therein without departing from the scope of the invention.

What is claimed is:

1. A decorative emblem comprising:
   a bezel having a cavity formed by a generally flat base and vertically upstanding peripheral sidewalls,
   a generally flat, embossed, and decorated foil shape located within said cavity in said bezel and spaced from 0.01 to 0.02 inches from said sidewalls, and
   a void-free, cured plastic lens cap contiguous with the peripheral edge of said upstanding sidewalls, filling said cavity of said bezel,
   said plastic lens cap being formed by casting a measured amount of fluent plastic material over said foil shape, the fluent plastic material migrating around the edges of said foil shape and between the space between said foil shape and said sidewalls of said bezel, and flowing underneath said foil shape on all sides, at least partially encapsulating said foil shape and permanently bonding it with said bezel.

2. The decorative emblem of claim 1 wherein the height of the embossment of said foil shape is 0.01 inches.

3. The decorative emblem of claim 1 wherein at least one channel is formed in the base of said bezel and extends beneath said foil shape, said cured plastic being contained within said at least one channel.

4. The decorative emblem of claim 1 wherein said foil shape is made of metal.

5. The decorative emblem of claim 1 including a coating of primer on said bezel to increase the adherence of said plastic to said bezel.

* * * * *